United States Patent [19]

Prescott et al.

[11] Patent Number: 4,641,927

[45] Date of Patent: * Feb. 10, 1987

[54] CHROMATIC ABERRATION CORRECTED GRADIENT INDEX LENS SYSTEM

[75] Inventors: Rochelle Prescott, Arlington; Dennis C. Leiner, North Andover, both of Mass.

[73] Assignee: Dyonics, Inc., Andover, Mass.

[*] Notice: The portion of the term of this patent subsequent to May 7, 2002 has been disclaimed.

[21] Appl. No.: 361,266

[22] Filed: Mar. 24, 1982

[51] Int. Cl.$^4$ .................................................. G02B 6/18
[52] U.S. Cl. ..................................... 350/413; 350/96.31
[58] Field of Search ................... 350/413, 96.31, 96.29, 350/96.30

[56] References Cited

U.S. PATENT DOCUMENTS

| | | | |
|---|---|---|---|
| 2,178,057 | 10/1939 | Van Heel | 350/482 |
| 2,527,370 | 10/1950 | Miles | 350/482 |
| 2,781,694 | 2/1957 | Takahashi | 350/414 |
| 3,486,808 | 12/1969 | Hamblen | 350/413 |
| 3,637,295 | 1/1972 | Matsumura et al. | 350/413 |
| 3,658,407 | 4/1972 | Kitano et al. | 350/413 X |
| 3,718,383 | 2/1973 | Moore | 350/413 |
| 3,729,253 | 4/1973 | Moore et al. | 350/413 |
| 3,807,836 | 4/1974 | Baker | 350/470 |
| 3,816,160 | 6/1974 | Moore | 350/413 |
| 3,827,785 | 8/1974 | Matsushita et al. | 350/413 |
| 3,830,640 | 8/1974 | Kitano et al. | 65/30 |
| 4,022,855 | 5/1977 | Hamblen | 264/1 |
| 4,101,196 | 7/1978 | Imai | 350/413 X |
| 4,515,444 | 5/1985 | Prescott et al. | 350/413 |

OTHER PUBLICATIONS

Conrady, A. E., *Applied Optics and Optics Design*, (1957) pp. 183-187.
Moore, D. J. and Sands, P. J., "Third Order Aberrations of Inhomogeneous Lens with Cylindrical Index Distributions", *Journal of the American Optical Society*, vol. 61, No. 9 (Sep. 1971) pp. 1195-1201.
Dyonics Inc., Needlescope, product literature.
Miler, M.; "Chromatic Aberrations of the Gradient Lens"; *Opto-Electronics Z*; 1970; No. 3; pp. (109-113).
Paxton et al; "Aberrations and Design of Graded-Index (Grin) Rods Used as Image Relays"; *Applied Optics*; vol. 10, No. 9, (Sep. 1971); pp. 2090-2096.

*Primary Examiner*—John K. Corbin
*Assistant Examiner*—Scott J. Sugarman

[57] ABSTRACT

An optical system and method is disclosed for substantially correcting an image transmitted through at least one gradient index lens for chromatic aberration by means of a homogeneous lens affixed thereto. In preferred embodiments, at least one of the gradient index lenses is a relay lens. The length of the relay lens is varied about an integral number of half periods and the homogeneous lens has a positive or negative curvature, depending upon the nature of the correction required. A method of determining the curvature of the homogeneous lens and the length of the relay lens for the desired degree of correction is also claimed.

15 Claims, 13 Drawing Figures

CHROMATIC ABERRATION CORRECTED GRADIENT INDEX LENS SYSTEM

BACKGROUND OF THE INVENTION

This invention relates to correction of chromatic aberration in optical systems containing gradient index lenses, particularly in gradient index endoscopes.

Optical images may be transferred by means of a lens system employing standard objective and relay lens sections. In applications where size is critical, e.g. in endoscopes for viewing within the body, e.g. in a joint, through a puncture wound without extensive surgical opening, a small-sized, e.g. 1 mm diameter, cylindrical rod lens system with radial index distribution (GRIN lens) may be substituted.

GRIN lenses currently available exhibit large amounts of chromatic aberration. A typical GRIN lens system exhibits a large degree of aberration in lateral color and in axial color, both typically undercorrect.

Prior efforts to correct for this aberration have been directed to the ocular system, typically a compound microscope, receiving the image from the GRIN lens system. These efforts have followed two approaches. In one approach, the microscope is designed to overcorrect for this aberration by an amount suitable to substantially correct the final image. The other approach involves adding a zero power corrector to the microscope, e.g. a cemented doublet of two glasses with the same principal index but widely differing dispersions and plano outer surfaces. Both approaches have had limited success in practical systems due to the precise alignment required between the ocular and GRIN lens systems in order for the correction to have the calculated corrective effect.

SUMMARY OF THE INVENTION

The invention relates to an optical system for correction of chromatic aberration of an image transmitted through a gradient index lens.

According to the invention, the system comprises at least a gradient index lens and a homogeneous lens affixed thereto.

In preferred embodiments, the gradient index lens system is axially symmetrical and is graded radially; and comprises at least an objective lens and a relay lens having graded indices.

In one specific embodiment where the image from the relay lens is undercorrect for axial chromatic aberration, the homogeneous lens is a negative lens, and preferably, where the image from the relay lens is undercorrect for lateral chromatic aberration, the length of the relay lens is within one quarter period less than an integral number of half periods of the relay lens, or, where the image from the relay lens is overcorrect for lateral chromatic aberration, the length of the relay lens is within one quarter period greater than an integral number of half periods of the relay lens. In another embodiment, where the image from the relay lens is overcorrect for axial chromatic aberration, the homogeneous lens is a positive lens, and preferably in this embodiment, where the image from the relay lens is overcorrect for lateral chromatic aberration, the length of the relay lens is within one quarter period less than an integral number of half periods of the relay lens, or, where the image from the relay lens is undercorrect for lateral chromatic aberration, the length of the relay lens is within one quarter period greater than an integral number of half periods of the relay lens.

In further aspects of the preferred embodiment, the system is adapted for use in an endoscope; and the diameter of the graded index lens system is of the order of about 1 mm.

In all of the above embodiments, the system is adapted to substantially correct the chromatic aberration in the image to the desired limit, e.g. typically to within one Rayleigh limit for endoscopes, although other limits are possible, e.g. where other aberrations are considered.

In another aspect, the invention relates to a method for correcting the chromatic aberration of an image transmitted through an optical system comprised of at least one gradient index lens.

According to this aspect of the invention, the method comprises affixing at least one homogeneous lens to the gradient index lens, and transmitting an image through the combined lenses.

In preferred embodiments of this aspect, the gradient index lenses of the optical system comprise at least an objective lens and a relay lens, the objective lens and the relay lens being axially symmetrical and graded radially, and the method comprises transmitting the image through the objective lens, and through the relay lens in succession, and transmitting the image through the homogeneous lens; and chromatic aberration of the image is substantially corrected by the method for lateral color and axial color.

Other aspects of the method of the invention comprise substantially correcting transmitted images having, in other combinations, undercorrect and overcorrect axial and lateral chromatic aberration by use of the optical system of the invention.

Another aspect of the invention relates to a method of determining, for an optical system comprising at least one gradient index relay lens and at least one homogeneous lens, the length of the relay lens and the curvature of the homogeneous lens to substantially correct the chromatic aberration of an image transmitted through the system.

According to this aspect of the invention, the method comprises: A. Choosing a relay lens with a predetermined length; B. Calculating by thin-lens approximation the curvature of a homogeneous lens necessary to correct the relay lens for axial chromatic aberration by the formula:

$$c = \frac{1}{l_d} + \left(\frac{N_d}{N_F - N_C}\right)\left(\frac{l_C - l_F}{l_d^2}\right) \quad (1)$$

where:
- $l_{d,F,C}$ = image distance in the material of the lens at each wavelength,
- $N_{d,F,C}$ = refractive index of the material at each wavelength,
- d = medium wavelength light,
- C = long wavelength light,
- F = short wavelength light, and
- c = curvature required to correct the axial chromatic aberration, "curvature" being the inverse of the radius of curvature;

C. Determining the lateral chromatic aberration for an optical system comprised of the relay lens and homogeneous lens of curve c; D. Repeating steps A through C at least one more time for a different length of relay lens of the same gradient index material; E. Plotting the lateral chromatic aberration determined by each step C versus the length of relay lens at the each respective step A; F. Interpolating to determine the length of relay lens having the desired lateral chromatic aberration; and G. Calculating, by the formula of step B, the curvature of a lens of the homogeneous material to correct the axial chromatic aberration of the relay lens of length determined at step F.

PREFERRED EMBODIMENT

The structure and operation of a preferred embodiment of the invention will now be described, after briefly describing the drawings.

DRAWINGS

STRUCTURE

Figure 1:
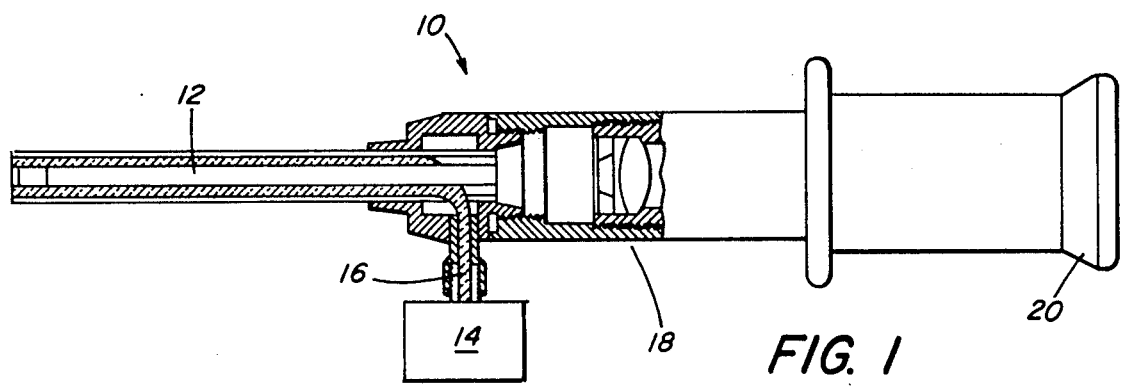
FIG. 1 is an side view partially in section of an endoscope employing the preferred embodiment.

Referring now to FIG. 1, an endoscope 10 is shown. Endoscopes, e.g. the Needlescope ® manufactured by Dyonics, Inc. of Andover, Mass., are typically used by surgeons for viewing within cavities of the body, e.g. the joint of the knee, without requiring that the body be surgically opened. The probe lens 12, within a cannula (not shown) is inserted into the body through a small puncture wound. Fiberoptic device 14 directs light through light guide 16 into the body to illuminate the viewing field and an image is returned through the probe lens to the probe ocular 18 which magnifies the image for viewing through eyepiece 20.

Figure 2:
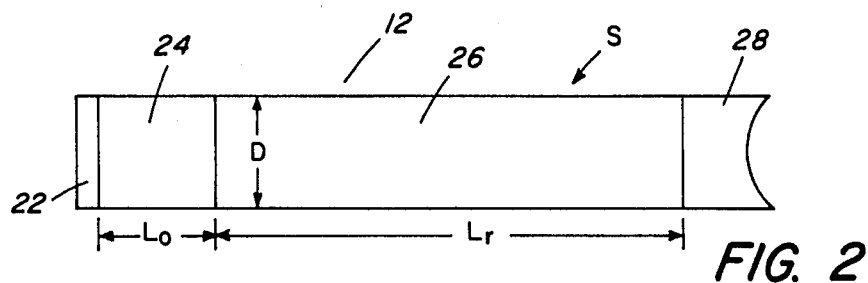
FIG. 2 is an enlarged side view of the preferred embodiment.

In FIG. 2, an enlarged view of the probe lens system is shown. At the distal end of probe 12 is cover glass 22 which protects the lenses during insertion and viewing. At the proximal side of cover glass 22 is objective lens 24, typically a microlens supplied by Nippon Sheet Glass Co., of Japan. Lens 24 is an axially symmetric, radially graded index lens, having diameter, D, and length, $L_0$, in this application typically 1 mm and 3 mm, respectively. Immediately proximal to objective lens 24 is relay lens 26, also supplied by Nippon Sheet Glass. Lens 26 is affixed to objective lens 24 by means of optical cement. Relay lens 26 is also axially symmetric and is radially gradient. Relay lens 26 has the same diameter, D, as the object lens, i.e. 1 mm in this application, and has a length, $L_r$, selected relative to the period of the lens. In this application, L is typically of the order of about 134 mm.

Figure 9A:
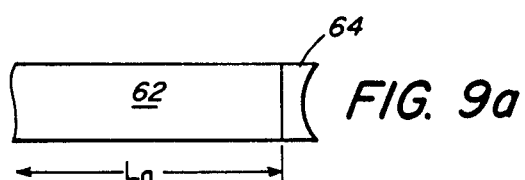
FIG. 9a, 9b, and 9c are somewhat diagrammatic side views of other optical systems corrected according to the invention.
Figure 9B:
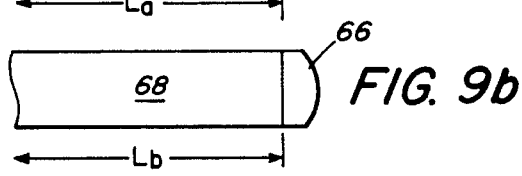
Figure 9C:
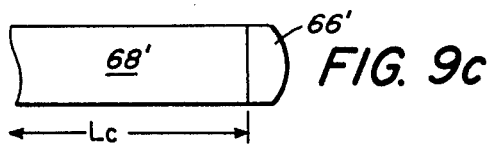

Affixed to the proximal end of relay lens, again typically by means of optical cement, is homogeneous lens 28, which in FIG. 2 is shown as having a negative curvature, but which may also have a positive curvature, as shown in FIGS. 9b and 9c discussed further below.

Chromatic Aberration Effect

Figure 3:
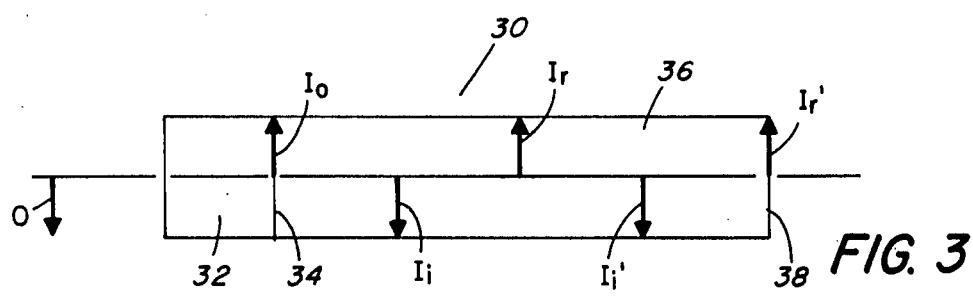
FIG. 3 is a representative plot of the image positions in a lens system of the preferred embodiment.

In FIG. 3, the transmission of an image through a standard gradient index lens system 30 is shown. The gradient index lens system is directed at object, O, in the viewing area. An inverted image, $I_O$, of object, O, is formed by the objective lens 32 at or near the interface 34. The relay lens 36 shown is two periods in length, i.e. the transmitted image is reformed at four points within the lens: $I_i$, $I_r$, $I_i'$, $I_r'$ in order from object, O, the last time at or near the rear or proximal face 38 of the lens 36.

Figure 4:
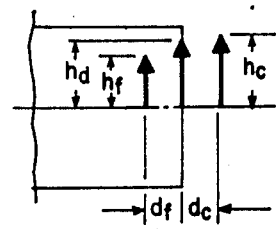
FIG. 4 is a somewhat diagrammatic representation of the axial and lateral chromatic aberrations to be corrected by the preferred embodiment.

The image of object, O, transmitted through the gradient index lens system 30 is, of course, a combination of different wavelengths which are refracted differently by transmission through the lenses. The image, $I_r'$, formed at interface 38 is a composite of the color components of the object. As shown representatively in FIG. 4, the color components are not reformed exactly at the interface, but rather at points about the interface. For example, referring to FIG. 4 showing the axial and lateral aberrations for the two period relay lens shown, the blue component image, F, is formed a distance, $d_F$, before the interface at height $h_F$, the red component image, C, is formed a distance, $d_C$, after the interface at height $h_C$, while the yellow component image, d, is formed at the interface at height $h_d$. (For the device shown in FIGS. 2 and 3, $d_F$ and $d_C$ are both of the order of about 0.5 mm, and $h_F$ and $h_C$ are both of the order of ±20 microns about $h_d$ for an image of height 0.5 mm.)

Comparing these typical axial and lateral aberrations to the level at which they may become noticeable to the viewer, i.e. the Rayleigh limit, or quarter wavelength tolerance, the axial aberration of the lens system of FIGS. 2 and 3 is of the order of 7.7 times the Rayleigh limit, of which about 90% is attributable to the relay lens, the remainder to the objective lens. The lateral aberration of this system is of the order of 5.1 times the Rayleigh limit and is attributable to the objective lens.

Process

Referring again to FIG. 2, the lens system, S, of the preferred embodiment is typically undercorrect for both axial and lateral color due to the presently available lens materials. In this system the negative homogeneous lens 28 is overcorrect for both axial and lateral chromatic aberrations. Use of a relay lens 26 of optimized length within one quarter period less than an integral number of half-periods in combination with a negative homogeneous lens 28 of proper curvature corrects both the axial and lateral chromatic aberration to within at least about one Rayleigh limit.

Figure 5A:
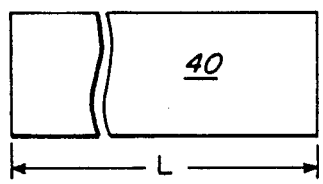
FIGS. 5a, 5b, and 5c are somewhat diagrammatic views of differing aspects of the correction of chromatic aberrations.
Figure 5B:
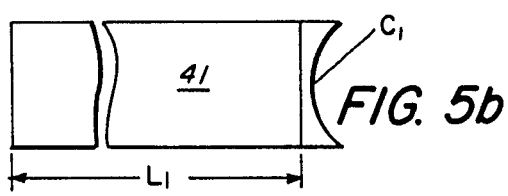

Referring now to FIG. 5a, relay lens 40 of the objective lens/relay lens system has length, L, equal analytically to an integral number of half periods. The length of the relay lens is reduced by an amount less than one quarter of a period, e.g. ⅛ of a period, to length $L_1$ (FIG. 5b). The negative curvature necessary for a homogeneous lens of known material to correct by the thin-lens approximation the axial chromatic aberration of the foreshortened lens system is calculated by the following well-known equation (see, e.g. *Applied Optics and Optics Design*, by A. E. Conrady (1957)):

$$c = \frac{l}{l_d} + \left(\frac{N_d}{N_F - N_C}\right)\left(\frac{l_C - l_F}{l_d^2}\right) \quad (1)$$

where $l_{d,F,C}$=image distance in the material of the lens at each wavelength, $N_{d,F,C}$=refractive index of said material at each wavelength, d=medium wavelength light,
C=long wavelength light,
F=short wavelength light, and
c=curvature required to correct the axial chromatic aberration, "curvature" being the inverse of the radius of curvature, to determine, $c_1$, for relay lens of length, $L_1$.

The lateral aberration of an optical system having a relay lens of length, $L_1$, and a homogeneous lens of the calculated negative curvature, $c_1$, are then determined and lateral chromatic aberration is plotted versus the length, $L_1$.

Figure 5C:
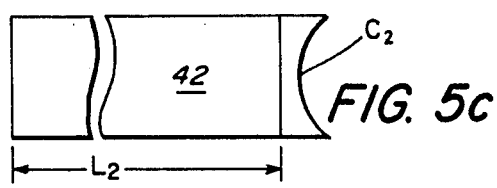

A slightly different length of relay lens is chosen (FIG. 5c).

Figure 6:
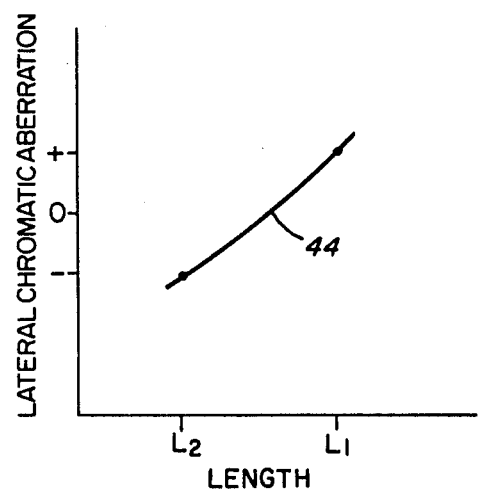
FIG. 6 is a representative plot of lateral chromatic aberration versus relay lens length of an optical system corrected according to the invention.

Curvature, $c_2$, is calculated for this new length, $L_2$, of relay lens 42 and the lateral chromatic aberration of this new system is determined and plotted (FIG. 6).

This procedure is repeated as many times as necessary to determine a curve 44 of lateral chromatic aberration versus relay lens length. The lens length, $L_c$, for the desired lateral aberration, e.g. less than one Rayleigh limit, is interpolated, the curvature, $c_c$, for the homogeneous lens necessary to also correct axial aberration for lens of length, $L_c$, is calculated according to Formula 1, with consideration of residual aberrations of the system, some of which may be introduced by the homogeneous corrector lens.

Figure 7:
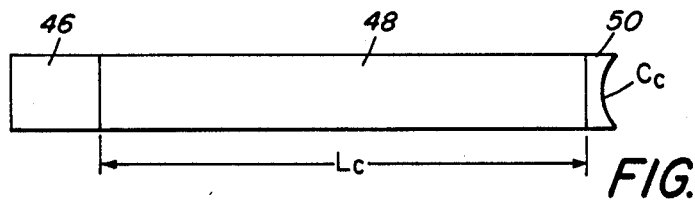
FIG. 7 is a somewhat diagrammatic side view of a corrected lens system.

The optical system, shown in FIG. 7, of objective lens 46, relay lens 48 of length, $L_c$, and homogeneous lens 50 of curvature, $c_c$, is then assembled.

EXAMPLES

Figure 8:
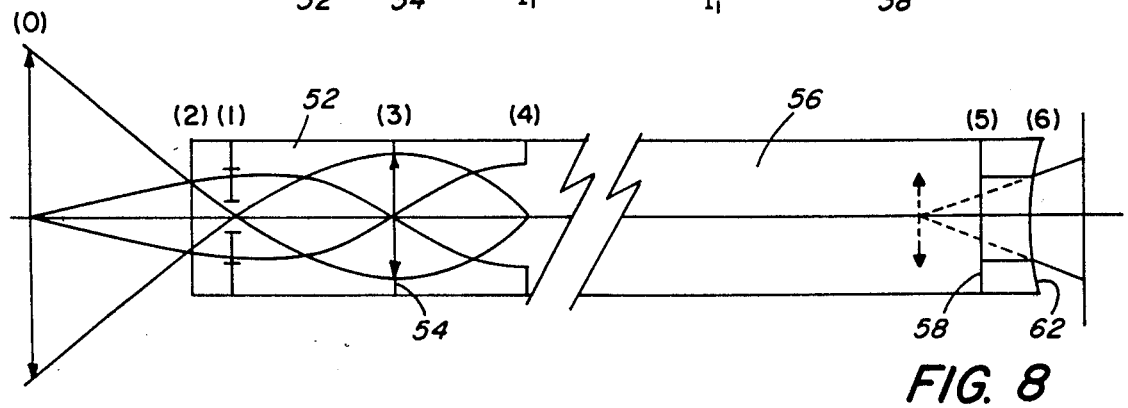
FIG. 8 is a somewhat diagrammatic side view of an optical system according to the invention.

A lens system using gradient index lenses is shown in FIG. 8. The surfaces are numbered by accepted design practice, i.e. surface (0) is the object plane; surface (1) is the entrance pupil; surface (2) is the first physical surface of the objective lens 52; surface (3) is the next physical surface, i.e. the interface 54 of the objective lens 52 and the relay lens 56; surface (4) is the aperture stop; surface (5) is the interface of the relay lens 56 and the homogeneous corrector lens 60; and surface (6) is the curved surface 62 of the corrector lens. In Table I, the axial thicknesses are measured from the indicated surface to the next consecutively numbered surface, positive distances being to the right. Curvature of the corrector lens 60 is indicated as the inverse of the radius of curvature. The following are examples of corrected lens systems with components determined according to the invention. The results are summarized in Table I.

EXAMPLE 1

The corrector lens material was A0T-5, supplied by Hoya Optics, Incorporated, of Fremont, Calif. The corrected system was determined to have a relay lens length ($L_c$ FIG. 7) of 87.5 mm and a corrector lens curvature, $c_c$, of 0.2382. The corrected axial color was 0.51, while the lateral color was 0.04 of their respective Rayleigh limits.

EXAMPLE 2

In this example, the corrector lens material was SF-57, supplied by Schott Optical Glass, Inc., of Duryea, Pa. The corrected system was determined to have a relay lens length, $L_c$, of 87.5 mm and a corrector lens curvature, $c_c$, of 0.4086. The corrected axial color was 0.53, while the lateral color was 0.05.

EXAMPLE 3

In this example, the corrector lens material was EK-812, supplied by Eastman Kodak Company, of Rochester, N.Y. In the corrected system, $L_c$, was 87.7 mm and, $c_c$, was 0.3120. The corrected axial color was 0.04, while the radial color was 0.08.

EXAMPLE 4

In this example, the corrector lens material was again EK-812 as in example 3, but a longer base length was used. In the corrected system, $L_c$, was 120.37 mm and, $c_c$, was 0.03780. The corrected axial color was 0.01, while the radial color was 0.05.

TABLE 1

| Type | Example 1 A0T-5 | Example 2 SF-57 | Example 3 EK-812 | Example 4 EK-812 |
|---|---|---|---|---|
| Surface Thickness | | | | |
| 0 | +3.4073 | +3.4073 | +3.4073 | +3.4073 |
| 1 | −0.3164 | −0.3164 | −0.3164 | −0.3164 |
| 2 | +3.0000 | +3.0000 | +3.0000 | +3.0000 |
| 3 | +16.8150 | +16.8150 | +16.8150 | +16.8150 |
| 4 | +71.6850 | +71.6850 | +70.8850 | +103.5550 |
| 5 | +0.5000 | +0.5000 | +0.5000 | +0.5000 |
| 6 | +5.0200 | −3.5421 | −4.0778 | −3.1044 |
| Curvature | −0.2383 | −0.4086 | −0.3120 | −0.3780 |
| Length (mm) | 88.5 | 88.5 | 87.7 | 120.37 |
| Image-Orientation | Erect | Erect | Erect | Inverted |
| Axial % | +50.93 | +53.32 | +3.83 | +1.09 |
| Lateral % | +4.00 | +4.92 | −7.75 | +5.25 |

OTHER EMBODIMENTS

Other embodiments of the invention are within the following claims. For example there are 3 other combinations of axial and lateral chromatic aberrations. In FIG. 9a, where a gradient index lens system has axial chromatic aberration that is undercorrect and lateral aberration that is overcorrect, a relay lens 62 of length, $L_a$, up to one quarter period over an integral number of half-periods may be used with a negative homogeneous lens 64, the lens curvature and relay lens length calculated according to the invention. Similarly, in a system (FIGS. 9b and 9c) where the axial chromatic aberration is overcorrect, a positive homogeneous lens 66, 66' may be used with the length of the relay lens 68, 68' within one quarter of a period over ($L_b$ FIG. 9b) or under ($L_c$ FIG. 9c) an integral number of half-periods where the lateral chromatic aberration is undercorrect or overcorrect, respectively. Again the length of relay lens 68, 68' and the curvature of the homogeneous lens 66, 66' are determined according to the invention.

We claim:

1. An optical system comprised of at least one gradient index lens and an image forming homogeneous lens affixed to an end surface of said gradient index lens, said gradient indes lens being of such a length that an image is not formed at its exit surface, said system constructed and arranged to substantially correct both axial and lateral chromatic aberration of an image transmitted through said system.

2. An optical system comprised of at least one gradient index lens graded radially, said gradient index lens having a length different than an integral number of half periods of said lens, the difference being less than a quarter period of said lens, the image transmitted through said lens thereby caused to form other than at the surface of the image end of said lens, and an image forming homogenous lens affixed to an end surface of said gradient index lens, said system constructed and arranged to substantially correct both axial and lateral chromatic abberation of an image transmitted through said system.

3. The optical system of claim 1 or 2 wherein said gradient index lens system is axially symmetrical and is graded radially.

4. The system of claim 3 wherein the image from said relay lens is overcorrect for axial chromatic aberration, and said homogeneous lens is a positive lens.

5. The system of claim 4 wherein the image from said relay lens is overcorrect for lateral chromatic aberration, and the length of said relay lens is within one quarter period less than an integral number of half periods of said relay lens.

6. The system of claim 4 wherein the image from said relay lens is undercorrect for lateral chromatic aberration, and the length of said relay lens is within one quarter period greater than an integral number of half periods of said relay lens.

7. The optical system of claim 1 or 2 wherein said lens system comprises at least an objective lens and a relay lens.

8. The system of claim 7 wherein the image from said relay lens is undercorrect for axial chromatic aberration, and said homogeneous lens is a negative lens.

9. The system of claim 8 wherein the image from said relay lens is undercorrect for lateral chromatic aberration, and the length of said relay lens is within one quarter period less than an integral number of half periods of said relay lens.

10. The system of claim 8 wherein the image from said relay lens is overcorrect for lateral chromatic aberration, and the length of said relay lens is within one quarter period greater than an integral number of half periods of said relay lens.

11. The system of claim 1 or 2 wherein said system is adapted for use in an endoscope.

12. The system of claim 1 or 2 wherein the diameter of said gradient index lens is of the order of 1 mm.

13. The optical system of claim 1 or 2 wherein said image forming homogenous lens is affixed to the image end of a gradient index lens of said system.

14. The optical system of claim 13 wherein said gradient index lens of length different than an intergral number of half periods of said image forming lens is a relay lens, and said homogenous lens is affixed to the surface at the image end of said relay lens.

15. A method of forming an optical system comprising at least one gradient index relay lens and at least one homogenous lens said method comprising:

A. Choosing a relay lens of length different from an integral number of half periods of said relay lens, the difference being less than a quarter period of said lens;

B. Determining by the thin-lens approximation the curvature of a homogenous lens necessary to correct said relay lens for axial chromatic aberration by the formula:

$$c = \frac{l}{l_d} + \frac{N_d}{N_F - N_C} \frac{l_C - l_F}{l_d^2}$$

$l_{d, F, C}$ = image distance in the material of the lens at each wavelength,
$N_{d, F, C}$ = refractive index of said material at each wavelength,
d = medium wavelength light,
C = long wavelength light,
F = short wavelength light, and
c = curvature required to correct the axial chromatic aberration, cruvature being the inverse of radius of curvature;

C. Determining the lateral chromatic aberration for an optical system comprised of the relay lens chosen in Step A, and a homogenous lens of curvature c, determined in Step B, D. Repeating steps A through C at least one more time for another length of the same relay lens, the length again being different from an integral number of half periods of said relay lens, with the difference being less than a quarter period of said lens;

E. Plotting the lateral chromatic abberation determined by each step versus the length of relay lens at the respective steps A;

F. Interpolating to determine the length of relay lens having the desired lateral chromatic aberration;

G. Determining by the formula of step B the curvature of a lens of said homogenous material to substantially correct the axial chromatic aberration of said relay lens of length determined at step F;

H. Providing a relay lens of the length chosen by interpolation in step F;

I. Providing a lens of homogenous material with the curvature calculated in step G; and J. Affixing the uncurved surface of the lens of Step I to the surface of the relay lens of Step H.

* * * * *